Figure 1:
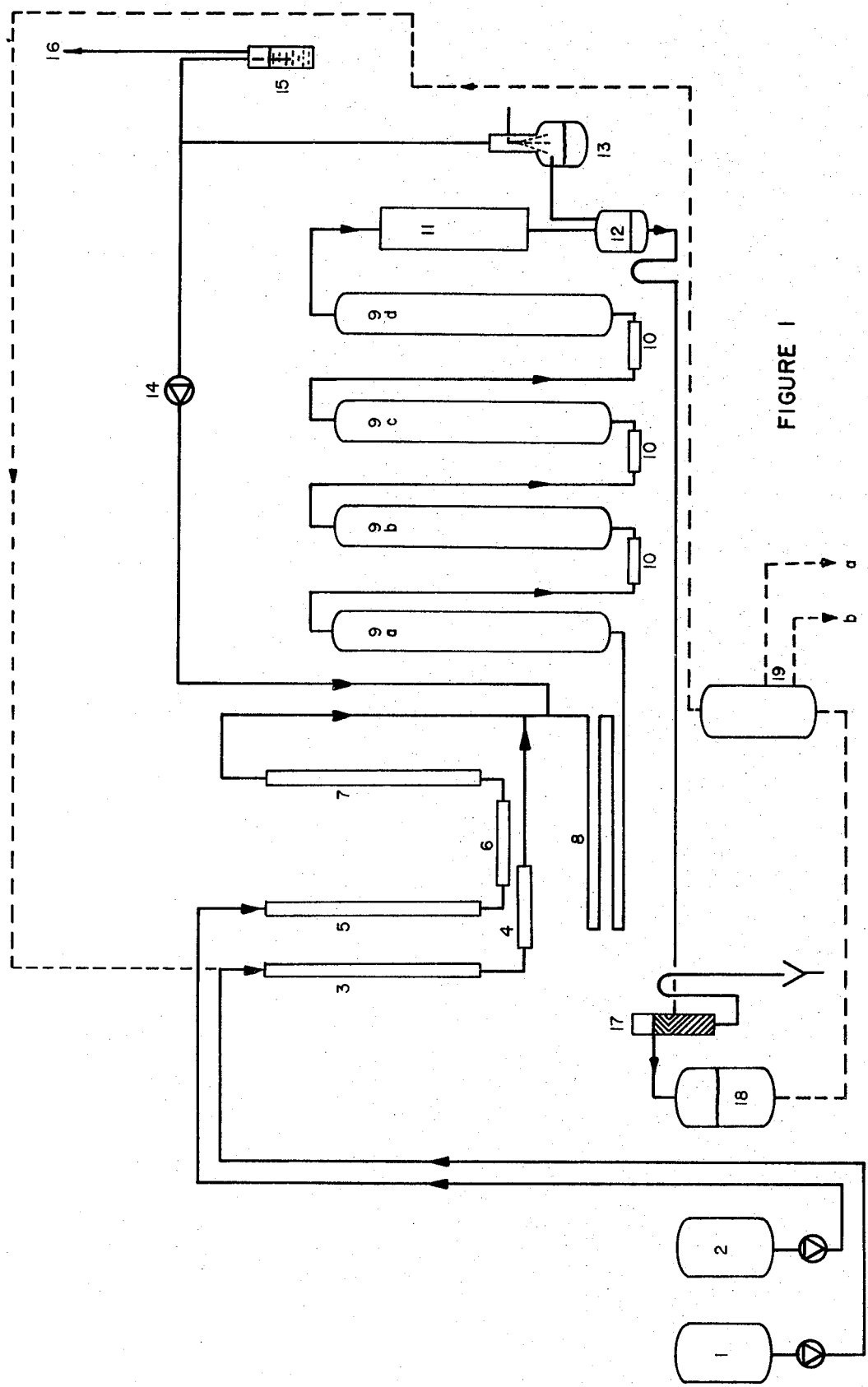

United States Patent [19]
Evans et al.

[11] 3,868,420
[45] Feb. 25, 1975

[54] NUCLEAR ALKYLATION OF ANILINS

[75] Inventors: Frank Evans, Pratteln, Basel-Land; Walter Frey, Muttenz, Basel-Land; Joerg Staeheli, Basel; Istvan Toth, Bottmingen, Basel-land, all of Switzerland

[73] Assignee: Sandoz Ltd., Basel, Switzerland

[22] Filed: Aug. 14, 1972

[21] Appl. No.: 280,353

[30] Foreign Application Priority Data
Aug. 20, 1971 Switzerland.................... 12299/71
Oct. 14, 1971 Switzerland.................... 15119/71

[52] U.S. Cl........... 260/578, 260/671 C, 252/466 R
[51] Int. Cl............................................. C07c 39/06
[58] Field of Search.................................... 260/578

[56] References Cited
UNITED STATES PATENTS
3,201,486  8/1965  Bielawski et al............... 260/578
3,365,347  1/1968  Lund et al....................... 260/578
3,733,365  5/1973  Yeakey et al.................... 260/578

OTHER PUBLICATIONS
Morrison and Boyd., Organic Chemistry, pp. 160, 161.

Industrial and Engineering Chemistry, Vol. 3, No. 7, pg. 1579–1584.

Primary Examiner—Donald G. Daus
Assistant Examiner—D. Wheeler
Attorney, Agent, or Firm—Gerald D. Sharkin; Richard E. Vila; Joseph J. Borovian

[57] ABSTRACT

The present invention provides a process for the production of phenylamines alkylated in the ortho and/or para positions by alkyl groups of 1 to 4 carbon atoms and unsubstituted on the amino group, which comprises reacting a phenylamine having an ortho and/or para position available for alkylation with an alkanol of 1 to 4 carbon atoms in the vapour phase and with heating to a temperature of from 350° to 450°C, using a catalyst selected from aluminium oxide and aluminium oxide/molybdenum oxide mixed catalyst in which the amount of molybdenum oxide is approximately from 0.01 to 20 percent by weight, which catalyst has a minimum surface area 50 m²/g.

8 Claims, 2 Drawing Figures

NUCLEAR ALKYLATION OF ANILINS

IMPROVEMENTS IN OR RELATING TO ORGANIC COMPOUNDS

This invention relates to a process for the production of phenylamines alkylated in the ortho and//or para positions.

The present invention provides a process for the production of phenylamines alkylated in the ortho and/or para positions by alkyl groups of 1 to 4 carbon atoms and unsubstituted on the amino group, which comprises reacting a phenylamine having an ortho and/or para position available for alkylation with an alkanol of 1 to 4 carbon atoms in the vapour phase and with heating to a temperature of from 350° to 450° C, using a catalyst selected from aluminium oxide and aluminium oxide/molybdenum oxide mixed catalyst in which the amount of molybdenum oxide is approximately from 0.01 to 20 percent by weight, which catalyst has a minimum surface area of 50 m²/g.

It has been found especially advantageous to use a catalyst with a surface area of from 150 to 300m²/g. The aluminium oxide catalysts can be produced by known methods. The aluminum oxide/molybdenum oxide catalysts, which are especially preferred, can also be produced in accordance with known methods, e.g., by impregnation of $Al_2O_3$ with an ammonium molybdate solution, drying and if necessary calcination (cf., for example, Journal of Catalysis 1969), page 202, column 1), which gives rise to an $Al_2O_3$ catalyst containing $MoO_3$. The preferred amount of molybdenum oxide is from 1 to 2.5 percent by weight.

For the process of this invention, aniline itself or an aniline substituted by alkyl of 1 to 4 carbon atoms on the amino group or on the nucleus which is present in the vapour phase at the reaction temperature is suitable. For instance, phenylamines optionally substituted by one or two alkyl radicals can be employed, which may be primary, secondary or tertiary phenylamines. The alkyl radicals of major interest are those with 1 or 2 carbon atoms. The following aromatic amines may be named as examples: aniline, toluidines (preferably o- or p-toluidine),xylidines (preferably 2,4- or 2,6-xylidine), ethyl anilines (e.g. o- or p-ethyl aniline), ethyl methyl aniline, N-ethyl aniline, N-methyl aniline and N,N-dimethyl aniline. For example in the formation of mesidine, aniline, toluidine, xylidine or their mixtures are preferably used. It is to be understood that when a N-substituted compound is used as starting material the alkanol to be used should correspond to the N-alkyl substituent. The alkanol is employed to best effect in at least the stoichiometric amount, but preferably in amounts not greater than in a 10:1 molar ratio. For example, for the production mesidine from aniline, preferably 4 to 7 mols of methanol are used, while when starting from toluidine preferably 3 to 6 mols of methanol are employed.

The catalyst, which of course must be present in the solid state at the reaction temperature, is used effectively in the form of globules, solid or hollow cylinders, pellets, or in some other form suitable for filling reactor vessels. The reaction vessel, which is generally a column or tube, is packed with the catalyst so that the vaporised reactants come into immediate contact with the largest possible surface area of catalyst.

The reaction can be conducted isothermally or adiabatically or with partial removal of heat. The pressure is of secondary importance for the progress of the reaction; practical considerations make it convenient to work at atmospheric pressure, but the use of higher pressures is practicable. It is of special advantage to carry out the disclosed process continuously.

The process of this invention enables phenylamines alkylated in the nucleus to be produced in high yield in relatively short times compared with the known processes. For example, the optium yield of mesidine may be, e.g., 75 to 80 percent of theory; if the N-methylated by-products are recycled in a continuous operating system an increase in the yield to approximately 80 to 85 percent of theory is realizable.

The by-products which may be formed in the reaction of this invention include hexamethyl benzene, which may be present in amounts to 7 percent, isoduridine, and decomposition products, notably gases such as $CO_2$, $CO$, $CH_4$, and hydrogen. Minor amounts of readily volatile amines also may be formed in the course of the reaction. The volatile by-products can be easily removed, or destroyed by combustion. The formation of by-products depends largely on the activity of the catalyst and in particular on the time-span of its use, further factors are the quantitative relation of the reactants and the reaction temperature.

If the process of this invention is operated continuously, it is advisable to regenerate the catalyst from time to time. An effective regeneration treatment is to direct air heated to 350° to 450°C over the catalyst to burn the organic substances it has absorbed. As the heat of combustion in the reaction is often very high, the temperature of the catalyst has to be closely controlled, and it may be found necessary to dilute the air further with an inert gas, for example nitrogen.

An installation for the continuous operation of the disclosed process is shown in diagrammatic form in FIG. 1. of the accompanying drawings. It comprises a storage tank 1 for the aromatic amine and a second storage tank 2 for the alcohol (alkylating agent), an evaporator 3 and a further evaporator 4, both for the phenylamine, and an evaporator 5, further evaporator 6 and superheater 7 for the alcohol. The amine is conducted from 1 through 3 and 4 and the alcohol from 2 through 5, 6 and 7. The alcohol and the amine then pass on for mixing and the mixture is conveyed, with or without the introduction of circulating gas (14), through the preheater 8 to a series of reactors 9 filled with catalyst. (In the diagram there are four of these: 9a, 9b, 9c and 9d, but the number may be smaller or greater than this, e.g. one, two, up to 10, depending on their size, the nature of the starting products, the type of catalyst, the temperature, and the rate of circulation of the gas). The reactors may be connected to each other through intermediate coolers 10 to enable the temperature of the circulating reactants and the reaction products to be reduced at need. The reactors may be heated to different temperatures, in which case the scale of temperature is chosen to suit the reactants and the catalyst, the first reactor or reactors being set at a lower temperature, e.g. 250°–350°C, while at least one of the following reactors is maintained at a temperature from 350° to 450°C. For the production of mesidine a suitable temperature setting is: reactor 9a 250°–360°C, reactor 9b 320°–400°C, reactor 9c 340°–420°C, reactor 9d 390°–430°C.

Figure 2:
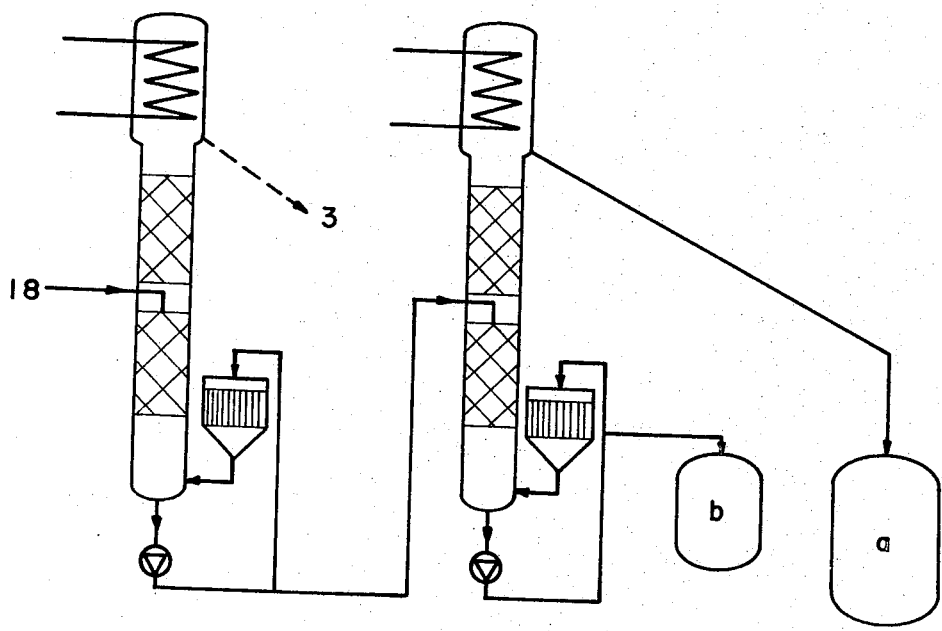

A cooler (condenser) 11 is provided for the mixture of reaction products and a gas/liquid separator 12 for separation of the cooled gaseous by-products. The liquid reaction products are conducted to 17, while the gaseous by-products are led to the gas washer 13 where, for example, ammonia is washed out. The gases can be removed through the collecting tube 15 to 16 and if necessary burned; gas for recycling can be returned by the pump 14. In 17, which is a separator for crude amine and water, the crude amine is separated from the water of reaction and any water of decomposition present, and conducted into the storage tank 18. The nucleo-alkylated amine is freed from unreacted amine and by-products in the rectifier 19. A rectifying device especially suitable for the rectification of mesidine is shown in FIG. 2 of the accompanying drawings. From 18 crude final product is led into the first rectifying column, in which unalkylated or partially alkylated amine is obtained as top fraction (distillation) and recycled to 3. The fraction containing the nucleo-alkylated amine and the less volatile by-products is led into the second rectifying column, where the nucleo-alkylated amine is obtained as top fraction (a), while the less volatile byproducts are separated as the bottom (sump) fraction (b). The rectifying device shown in FIG. 2 has two columns, but a single column which is capable of separating several fractions can be used, or a rectifier with more than two columns, as for example when unalkylated or partially alkylated products have to be fractionated.

The following Examples illustrate the process of this invention in a continuous operating system, using an installation corresponding to that described above.

EXAMPLE 1

From the storage tank 1 51 parts by weight of p-toluidine per hour are conducted into the thin-film evaporator 3, and from the storage tank 2 49 parts by weight of methanol per hour into the thin-film evaporator 5. In the further evaporators 4 and 6 respectively, any drops falling down the previous evaporators are vaporized. The methanol vapour is superheated further in 7. The two gas currents are then united and conducted, with the circulating gas, into the preheater 8, where the gas mixture is heated up to 260°C for entry into the first reactor 9a. On leaving this reactor the temperature of the gas current is about 375°C owing to the heat reaction. It is cooled to 355°C in the intermediate cooler 10 before passing into the second reactor 9b. This procedure is repeated prior to entry into the third and fourth reactors. (Exit temperature from reactor 9b 425°C, entry temperature into reactor 9c 390°C, exit temperature from reactor 9c 440°C, entry temperature into reactor 9d 405°C, exit temperature from reactor 9d 435°C). The reaction gases from reactor 9d are condensed in the condenser cooler 11 and the condensate cooled to 60°C. The uncondensed gases are separated in the gas/liquid separator 12, purified from any entrained solids or liquid in the gas washer 13 and returned, with circulating gas, to the reaction cycle. The gas residue through the separating vessel 15 to be burned (16). From the gas/liquid separator 12 the collected liquid flows into the vessel 17, where the crude residue is separated from the water of reaction. The crude mesidine is then conveyed into the storage tank 18 (62 parts by weight per hour). It is rectified in the rectifier 19 (FIG. 2).

After the aforedescribed continuous process has been in operation for about 10 to 20 days, regeneration of the catalyst is necessary to maintain its activity at the desired level. For the regeneration treatment, the reactor is first cooled with nitrogen gas, thereby bringing the temperature of the catalyst to about 350°C. The reactor gas is then circulated, the optimum amount being about 200 litres per hour and kilogram of catalyst. Subsequently air is added to the circulating gas in an optimum amount of about 30 litres per hour and kilogram of catalyst. The ratio of air to circulating gas is limited by the maximum permissible catalyst temperature, which should not exceed 450°C. After about 24 hours, regeneration is complete. The amount of circulated gas can then be carefully diminished and the supply finally turned off. During this phase too the catalyst temperature should not increase to above 450°C. Afterwards, air is directed through the catalyst at the rate of 30 to 60 litres per hour and kilogram of catalyst until the $CO_2$ content of the spent air falls to less than 2 percent. Regeneration is then complete and the production plant can be set for further operation as described above.

In Table 1 below further examples of the production process are detailed.

Table 1

| Exple No. | Catalyst (220 m²/g) Type | Parts by weight | Temperature in °C | Rate of feed in kg/h | | Yield of crude mesidine in kg/h | Composition of crude mesidine | | | |
|---|---|---|---|---|---|---|---|---|---|---|
| | | | | | | | Pre-fraction | Mesidine | Hexa-methyl benzene | Iso-duridine |
| 1 | $Al_2O_3$ | 175 | 260–440 | 5,1 | Paratoluidine | 6,2 | 7 % | 77 % | 9 % | 6 % |
| | | | | 4,9 | Methanol | | | | | |
| 2 | $Al_2O_3$ +1% $MoO_3$ | 120 | 265–430 | 5,0 | Paratoluidine | 6,3 | 19 % | 75 % | 5 % | |
| | | | | 5,0 | Methanol | | | | | |
| 3 | $Al_2O_3$ +1% $MoO_3$ | 120 | 250–440 | 4,1 | Aniline | 5,2 | 33 % | 59 % | 6 % | |
| | | | | 7,0 | Methanol | | | | | |
| 4 | $Al_2O_3$ +2% $MoO_3$ | 120 | 250–435 | 5,0 | Paratoluidine | 6,5 | 20 % | 77 % | 3 % | |
| | | | | 4,5 | Methanol | | | | | |
| 5 | $Al_2O_3$ +1% $MoO_3$ | 120 | 250–425 | 4,5 | Aniline | 5,8 | 21 % | 70 % | 7 % | |
| | | | | 6,5 | Methanol | | | | | |
| 6 | $Al_2O_3$ +1% $MoO_3$ | 120 | 250–430 | 0,5 | 2,6 Xylidine | 6,2 | 27 % | 65 % | 6 % | |
| | | | | 4,0 | Aniline | | | | | |
| | | | | 6,4 | Methanol | | | | | |

EXAMPLE 7

If a mixture of 194 parts of methanol, 163 parts of p-toluidine and 45 parts of a top fraction from distillation is employed under the same reaction conditions as in Example 1, 259 parts of crude mesidine are obtained. Distillation of the crude mesidine gives three fractions, namely a top fraction of 45 parts, 163 parts of pure mesidine and 51 parts of residue. As the amount of distillate used in the reaction is the same as that obtained at the end of the process, the yield of mesidine from p-toluidine is 80 percent of theory.

Further examples of phenylamines alkylated in the nucleus which can be produced in accordance with this invention are given in the following Table II.

a solution of 11.5 parts by weight of ammonium molybdate 86 percent in 630 parts by weight of water. The wet catalyst is packed in the reactor and dried with a current of nitrogen gas at a rate of flow of 100 litres per hour and kilogram of catalyst, first for 3 hours at 120°C and then for 21 hours at 440°C.

What is claimed is:

1. A process for the production of phenylamine alkylated in the ortho and/or para positions by alkyl groups of 1 to 4 carbon atoms and unsubstituted on the amino group, which comprises the step of reacting a phenylamine having an ortho and/or para position available for alkylation with an alkanol of 1 to 4 carbon atoms in the vapour phase and with heating to a temperature

TABLE II

| Example number | Starting products | | Mol ratio | Catalyst | Maximum temperature in °C. | Final product | Yield in percent of theory |
|---|---|---|---|---|---|---|---|
| | Alcohol | Amine | | | | | |
| 8 | $CH_3OH$ | 4-ethylaniline | 5:1 | $Al_2O_3$ | 445 | 2-methyl-4-ethylaniline | 30 |
| 9 | $CH_3OH$ | 4-ethylaniline | 4:1 | $Al_2O_3$ | 430 | 2,6-dimethyl-4-ethylaniline | 50 |
| 10 | $C_2H_5OH$ | 3,4-dimethylaniline | 3:1 | $Al_2O_3$ plus 2.5% $MoO_3$ | 380 | 2-ethyl-4,5-dimethylaniline | 19 |
| 11 | $CH_3OH$ | 4-methylaniline | 1,2:1 | $Al_2O_3$ | 445 | 2,4-dimethylaniline / 2,6-dimethyl-4-methylaniline | 40 / 20 |
| 12 | $CH_3OH$ | 4-methylaniline | 2:1 | $Al_2O_3$ | 445 | 2,4-dimethylaniline / N,2,6-trimethyl-4-methylaniline | 27 / 27 |

The $Al_2O_3$ catalyst containing 1 percent $MoO_3$ is produced as follows: 100 parts by weight of $Al_2O_3$ catalyst in the form of round tablets are thoroughly mixed with of from 350° to 450°C, in the presence of aluminum oxide/molybdenum oxide mixed catalyst in which the amount of molybdenum oxide is approximately from 0.01 to 20 percent by weight, which catalyst has a minimum surface area of $50m^2/g$.

2. A process according to claim 1, in which the catalyst has a surface area of from 150 to 300 $m^2/g$.

3. A process according to claim 2, in which a catalyst is used containing from 1 to 2.5 percent by weight of molybdenum oxide.

4. A process according to claim 1 wherein the alkanol:phenylamine mol ratio is at least stoichiometric but not greater than 10:1.

5. A process according to claim 1 for the production of phenylamine methylated in the ortho and/or para positions and unsubstituted on the amino group, which comprises the step of reacting a phenylamine having an available ortho and/or para position with methanol in the vapor phase and with heating to a temperature of from 350° to 450°C. in the presence of an aluminum oxide/molybdenum oxide mixed catalyst which the amount of molybdenum oxide is approximately from 0.01 to 20 percent by weight, which catalyst has a minimum surface area of $50m^2/g$.

6. A process according to claim 5, in which a phenylamine selected from aniline, toluidines, xylidines and mixtures of any two or more thereof is reacted with methanol to produce mesidine.

7. A process according to claim 6, in which p-toluidine is reacted with methanol to produce mesidine.

8. A process according to claim 7, in which the molecular ratio of methanol to p-toluidine is in the range from 2:1 to 10:1.

* * * * *